Figure 1:
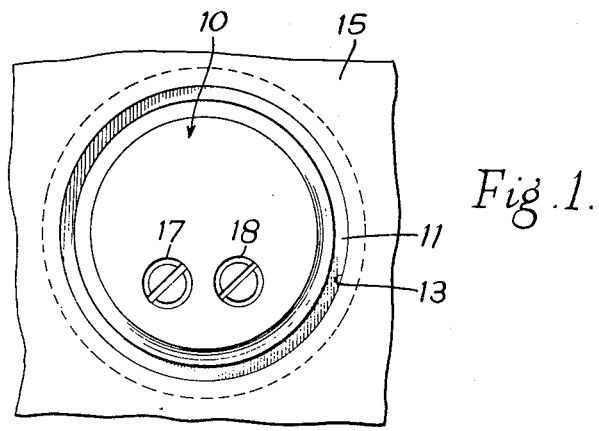

Oct. 16, 1962　　　B. O. THURSTON　　　3,058,370
ADJUSTABLE CAM DEVICES
Filed Aug. 4, 1960

INVENTOR
BRYAN OLIVER THURSTON

BY
Rudolph J Hurich

ATTORNEY

United States Patent Office 3,058,370
Patented Oct. 16, 1962

3,058,370
ADJUSTABLE CAM DEVICES
Bryan Oliver Thurston, Hatfield, England, assignor to Daystrom, Incorporated, Murray Hill, N.J., a corporation of Texas
Filed Aug. 4, 1960, Ser. No. 47,511
4 Claims. (Cl. 74—568)

This invention relates to adjustable cam devices and is more particularly concerned with an adjustable contour helical cam which has particular, although by no means exclusive, application as an adjustable control cam for an oil burner control unit for use on domestic oil heating equipment.

One object of the invention is to provide a helical cam device in which the pitch of the helical cam surface is readily adjustable. Another object of the invention is to provide a helical cam device in which both the pitch of the helical cam surface and the datum position of such helical cam surface with respect to a supporting body upon which the cam surface is mounted are each readily adjustable. A further object of the invention is to provide a rotatable helical cam device by which the amount of movement imparted to a controlled element for a predetermined angular rotation of such cam device is readily adjustable and in which the datum position of such controlled element for a given angular setting of the rotatable cam device is likewise readily adjustable.

In accordance with one aspect of the invention, an adjustable contour helical cam comprises an incomplete ring of flexible or semi-flexible material and means for adjustably displacing the two ends of said incomplete ring relatively to one another in a direction parallel with the ring axis.

In accordance with another aspect of the invention, an adjustable contour helical cam comprises a member of flexible or semi-flexible material in the form of a helix having more than one turn and means for adjustably displacing the opposite ends of said helical member relatively to one another in a direction parallel with the axis of said helical member.

In accordance with yet another aspect of the invention, an adjustable contour helical cam comprises an incomplete ring of flexible or semi-flexible material, a mounting body disposed within said incomplete ring and arranged for rotation about an axis coincident with that of said ring and means carried by and secured to said mounting body for adjustably displacing the ends of said incomplete ring relatively to one another in a direction parallel to said axis of rotation.

In a particular form of the invention, the cam surface is provided by a member of flexible or semi-flexible material in the form of a radially divided ring carried upon a mounting body arranged for rotary movement without longitudinal displacement upon an axis coincident or substantially coincident with that of said ring and means are provided for adjustably displacing each of the two opposite ends of said diveded ring relative to said mounting body in directions which are parallel with said axis of rotation whereby the ring may be distorted to an accurately controlled extent and also shifted longitudinally along said mounting body to provide a helical cam surface of adjustable pitch and adjustable axial position.

Figures 2, 3:
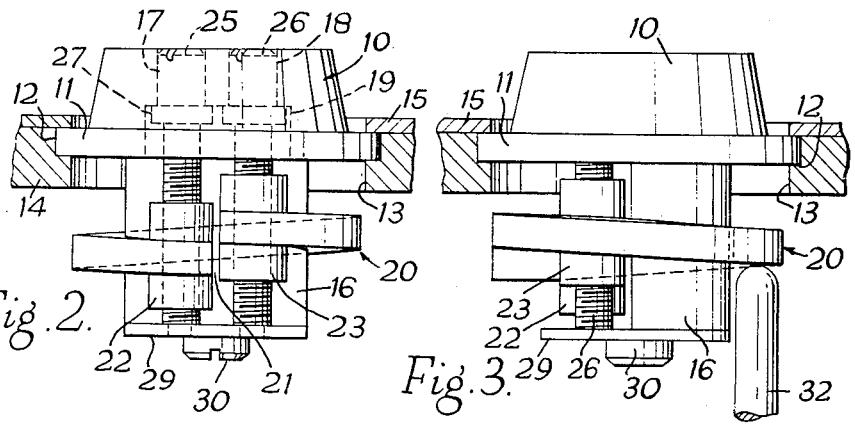
Figure 4:
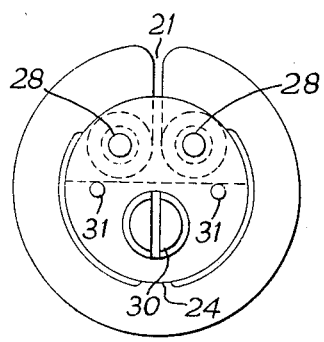

In order that the invention may be more readily understood, one particular embodiment thereof, as applied to a rotary control member for the metering valve of a domestic oil burner, will now be described by way of illustrative example only and with reference to the accompanying drawings, in which:

FIG. 1 is a plan view of the external control knob of a cam device embodying the invention.
FIG. 2 is a side elevational view, partly in section, of the cam device of FIG. 1.
FIG. 3 is a side elevational view taken at right-angles to that of FIG. 2 of the same cam device, while
FIG. 4 is an underside plan view of the device of FIGS. 1, 2 and 3.

In the type of oil burner equipment with which the embodiment about to be described is adapted to form part, vertical movement of a metering valve member serves to control the rate of flow of oil to the burner and it is desirable that it should be possible, during installation or subsequent maintenance of the equipment, to set both the minimum and the maximum oil flow rates to particular chosen values and thereafter to provide, by means of rotary movement of a control knob, a linear and infinitely variable control between the aforesaid maximum and minimum settings. It is also desirable that, regardless of the particular maximum and minimum settings decided upon, the angle of rotation of the control knob between the aforesaid maximum and minimum positions should be constant and still have a linear relationship with the adjusted height of the aforesaid vertically movable metering valve member and hence of the oil flow rate.

Referring now to the drawings, the device shown comprises a rotatable knob 10 conveniently of frusto-conical shape and suitably knurled around its conical peripheral surface, said knob being provided with an annular skirt flange 11 which is received within a complementary circular recess 12 formed around the edge of a circular aperture 13 in a plate 14 which constitutes part of the housing of the burner control mechanism. The flange 11 is retained within the recess 12 by means of an overlying cover plate 15 to permit free rotation of the knob 10 while preventing any axial movement thereof.

On the underside of the knob 10 and preferably made integral therewith, is provided a mounting body 16 which is conveniently of D-section or semi-cylindrical shape. At the lowermost end of such body 16 is secured a circular metal bearing plate 29 of the same radius as and co-axial with the body 16. Such plate is secured to the end surface of the mounting body by means of a screw 30 and locating dowels 31 carried by the mounting body and entering apertures in the end plate.

Within the knob 10 are provided two parallel bores 17, 18 whose centres lie at a common radius from the axis of the knob while a recess 19 in the underside of said knob leads to the rearward end of such bores from the rearward face of the flange 11. The plate 29 is provided with two bearing holes 28 in axial alignment respectively with the said bores 17 and 18.

Around the mounting body 16 is disposed an annulus or ring-like member 20 which, while of relatively stiff character, nevertheless possesses sufficient flexibility to permit distortion thereof as described later. A convenient material for such ring-like member is nylon. This ring is of rectangular cross-section over most of its length and is split radially at 21. Rigidly secured at each of the two opposing ends of this ring 20, preferably by integral moulding therewith, are two drilled and tapped bosses 22, 23, the respective axes of said bosses being disposed in alignment with the common axes of the bores 17, 18 and holes 28. At a point diametrically opposite to the split 21, the ring 20 is provided with an inwardly directed spigot region 24 having an arcuate inwardly facing surface of the same curvature as the outermost cylindrical surface of the mounting body 16.

The bores 17, 18 receive respectively the cylindrical heads of two metal screws 25, 26, each of such heads having inner flanges 27 which engage and seat upon the inner surface of the recess 19. The opposite, innermost, end of each of such screws is reduced in diameter to form a bearing spigot which is received in freely rotatable manner in the related bearing hole 28 of the end plate 29. Intermediately the screw-threaded shanks of such screws 25, 26 pass respectively through the tapped bosses 22 and 23 at the opposing ends of the ring 20. The two screws accordingly lie parallel with one another and with the axis of the knob 10 and are angularly displaceable about such axis of rotation of the knob 10 when the latter is itself rotated.

The associated oil flow control mechanism comprises a cam follower member 32 in the form of an upwardly directed and axially reciprocable rod having a part-spherical upper surface which bears against the lower radially directed surface of the ring 20 and is resiliently urged by means not shown to maintain it in contact with such surface. This follower member is constrained to move in a vertical direction only and is coupled to the flow control valve of the burner mechanism.

The operation of the device described is as follows. By turning both screws 25 and 26 in the same direction, the axial position of the ring 20 with respect to the mounting body 16 may be varied as desired within the limits imposed by the physical size and shaping of the various parts. By rotating the screws 25 and 26 in mutually opposite directions, the ring 20 may be distorted to form a helical cam surface of adjustable pitch and of either left- or right-hand sense. Thus, by moving the boss 22 upwardly relative to the boss 21, the resultant helical cam surface takes on a conventional left-handed helical aspect whereas movement of such boss 22 downwardly relative to the boss 21 imparts an opposite or right-handed helical shaping. When the ring 20 is thus distorted, the spigot region 24, by its seating contact upon the outer surface of the mounting body 16, assists in stabilising the ring 20 particularly when it is in engagement with the follower 32 at a region in the vicinity of such spigot 24, i.e. diametrically opposite to the secured ends of the ring.

Thus, by appropriate adjustment of the two screws 25 and 26, a wide range of pitch dimensions may be provided for the cam surface operative upon the follower 32 while the datum position of this cam surface with respect to the mechanism of which said follower member 32 forms a part may be adjusted over a correspondingly wide range by adjustment of both screws 25, 26 in the same direction. Rotation of the control knob 10 can thus be caused to produce vertical movement of the follower member 32 with the desired minimum and maximum height positions of the latter coincident with opposite ends of the rotary movement path of the knob 10. The required linear relationship between the angle of rotation of the knob 10 and the corresponding vertical position of the cam follower member 32 is automatically ensured.

While the invention has been particularly described with reference to a control knob for an oil valve system, it will be apparent that many other applications exist for a broadly similar construction. For example, instead of associating the mounting body with a manually rotatable control knob, such member may form part of any rotary mechanism in which a given degree of angular rotation is desired to produce a predetermined linear or arcuate displacement movement. Instead of using a cam follower engageable with one side only of the split ring, such ring may be engaged by a forked or like element engageable with both of two axially directed surfaces thereof to provide positive displacement movement of a controlled element thereby in both directions.

Furthermore, instead of making the rotatable mounting body itself non-displaceable in the axial direction and employing a cam follower which is axially displaceable, a reverse arrangement may be used in which the follower is fixed in position and rotation of such mounting body with the split ring thereon is arranged to produce a related axial displacement of the mounting body itself.

It will be evident that various other modifications may also be made; for example, the split ring may be replaced by a flexible or semi-flexible helical member of more than one turn whereby an adjustable pitch helix having an operative surface extending over an arc greater than 360° may be provided.

I claim:

1. An adjustable contour helical cam assembly adapted to be held by a mounting plate having a circular aperture therein, said circular aperture having a circular recess and an overlying cover plate secured to said mounting plate, thereby to retain said cam assembly, said cam assembly comprising:

a knob having an axis of rotation and an annular skirt flange adapted to fit in said circular recess and be retained therein by said cover plate, said knob including a semi-cylindrical shaped mounting body having an end remote from said flange, a circular metal end plate having substantially the same radius as said mounting body coaxially secured to the remote end of said mounting body, said knob having two substantially parallel bores therein adjacent said mounting body whose centers lie at a common radius from the axis of said knob, an adjustable cam member of flexible material in the form of a helix having opposite ends, the cam member being positioned about the mounting body portion of said knob and having an outside radius less than the radius of said circular aperture, two separate adjustable support means mounted respectively by said end plate and different ones of said bores for adjustably supporting the opposite ends of the cam member, said support means each being individually adjustable through the bores in said knob to move the opposite ends of said cam member relative to one another in a direction substantially parallel to the axis of said knob, whereby said cam member may function as a cam whose contour is readily adjustable through the bores in said knob.

2. The combination set forth in claim 1 which also includes a spigot means on said cam member intermediate the opposite ends thereof in seating contact with said mounting body to stabilize said cam member against inadvertent distortion.

3. The combination set forth in claim 1 in which each of said bores has a recessed portion, and each support means includes an adjusting screw having a flanged portion adapted to engage the recessed portion of a respective one of said bores thereby to be positioned by said end plate and said recessed portions.

4. The combination set forth in claim 3 wherein said support means includes bosses affixed to the opposite ends of the cam member and threaded on said adjusting screws.

References Cited in the file of this patent

UNITED STATES PATENTS

| 1,700,361 | Asbury | Jan. 29, 1929 |
| 2,402,447 | Pritchard | June 18, 1946 |
| 2,573,638 | Bryant | Oct. 30, 1951 |
| 2,618,764 | Rieber | Nov. 18, 1952 |

FOREIGN PATENTS

| 392,646 | Germany | Mar. 24, 1924 |